(12) United States Patent
Patrov (10) Patent No.: US 10,532,552 B2
(45) Date of Patent: Jan. 14, 2020

(54) BUILD PATTERNS FOR SURFACES OF A THREE-DIMENSIONALLY PRINTED OBJECT

(71) Applicant: MakerBot Industries, LLC, Brooklyn, NY (US)

(72) Inventor: Andrey V. Patrov, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 283 days.

(21) Appl. No.: 15/331,290

(22) Filed: Oct. 21, 2016

(65) Prior Publication Data

US 2017/0113409 A1    Apr. 27, 2017

Related U.S. Application Data

(60) Provisional application No. 62/245,663, filed on Oct. 23, 2015.

(51) Int. Cl.
*B33Y 10/00* (2015.01)

(52) U.S. Cl.
CPC .................................. *B33Y 10/00* (2014.12)

(58) Field of Classification Search
CPC ....... B33Y 10/00; B33Y 50/02; B29C 64/386; B29C 64/106
See application file for complete search history.

(56) References Cited

U.S. PATENT DOCUMENTS

2015/0091200 A1*   4/2015   Mech .................... B33Y 10/00
264/40.7

OTHER PUBLICATIONS

S. Gonzalez-George, Handy 3D printing tips by CREAT3D: Rafts, supports & brims, https://www.desktop3dprinter.com/news/handy-3d-printing-tips-by-creat3d-rafts-supports-brims.html, Feb. 26, 2014.*

* cited by examiner

*Primary Examiner* — James M Mellott
(74) *Attorney, Agent, or Firm* — Strategic Patents, P.C.

(57) ABSTRACT

Linear lengths of build material are initially deposited spaced apart from one another, with the resulting gaps or offsets filled in by subsequent deposition passes. In this manner, each straight length of material can cool independently before bonding to other adjacent lengths of material, thereby avoiding or mitigating non-axial stresses on each linear length of material as it cools.

20 Claims, 8 Drawing Sheets

BUILD PATTERNS FOR SURFACES OF A THREE-DIMENSIONALLY PRINTED OBJECT

CROSS-REFERENCE TO RELATED APPLICATIONS

This application claims the benefit of U.S. Provisional Application No. 62/245,663 filed on Oct. 23, 2015, the entire content of which is hereby incorporated by reference.

TECHNICAL FIELD

The disclosure relates to techniques for three-dimensional printing, and more specifically to printing with patterns of material deposition that mitigate thermally-induced warping.

BACKGROUND

Thermoplastics and other materials used in three-dimensional printing can have large coefficients of thermal expansion. As these materials cool during fabrication, they can shrink significantly and introduce mechanical stresses into a fabricated object. In some cases, this causes a surface of the fabricated object to mate with a build platform and to warp and delaminate from the build platform during printing, resulting in deformed surfaces or possibly a complete failure of the print, e.g., if the warping is so severe that the object becomes physically dislodged from the build platform during fabrication.

There remains a need for improved techniques to print the initial layers of an object that bond to a build platform, and in particular, techniques that mitigate thermally-induced warping and delamination as a build material cools.

SUMMARY

Linear lengths of build material are initially deposited spaced apart from one another, with the resulting gaps or offsets filled in by subsequent deposition passes. In this manner, each straight length of material can cool independently before bonding to other adjacent lengths of material, thereby avoiding or mitigating non-axial stresses on each linear length of material as it cools.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms unless specifically stated.

The following description emphasizes three-dimensional printers using fused deposition modeling or similar techniques where a bead of material is extruded in a layered series of two dimensional patterns as "roads," "paths," or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

Figure 1:
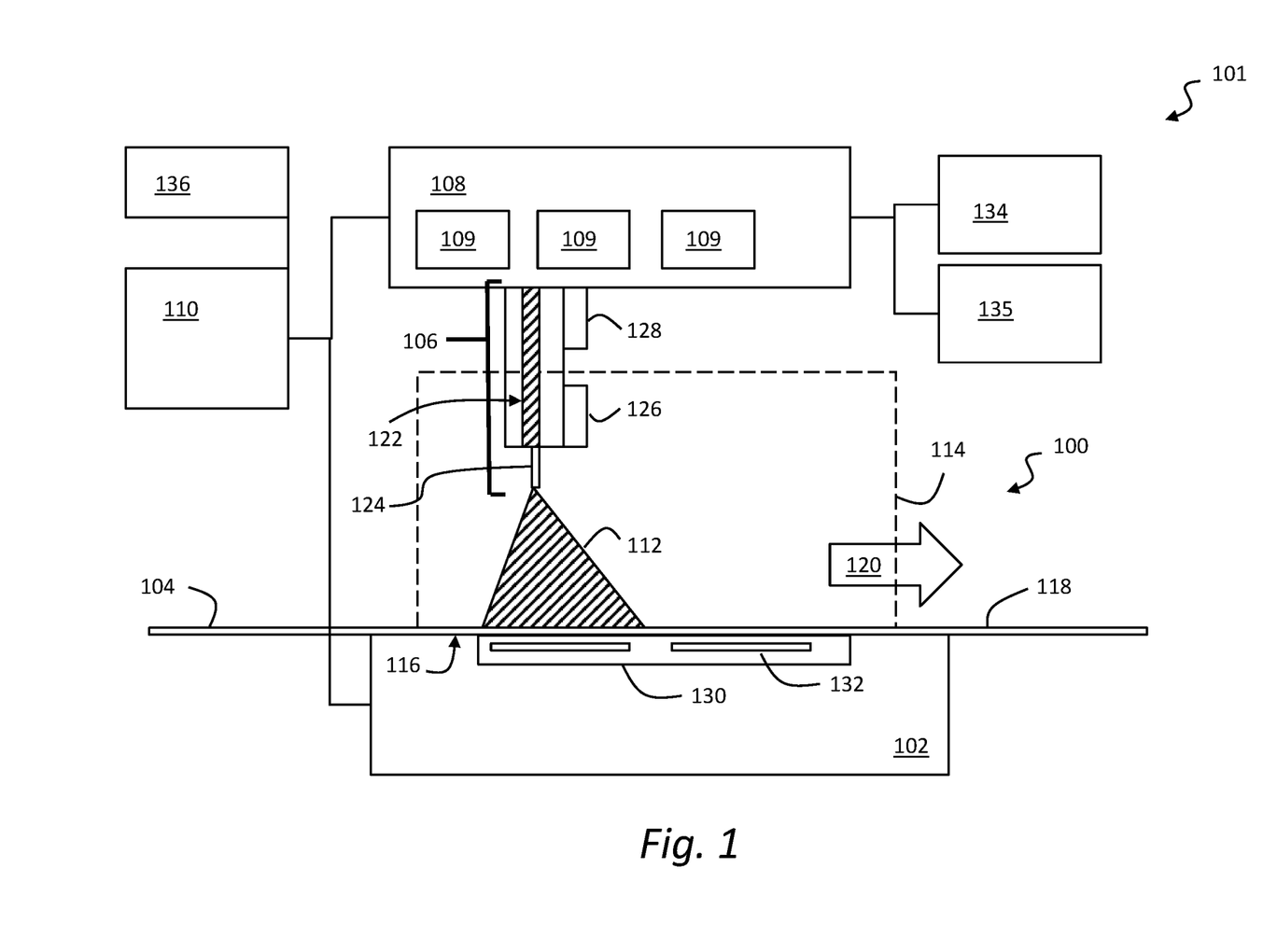
FIG. 1 is a block diagram of a three-dimensional printer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100. The printer 100 and its components may be included in a standalone, independent piece of equipment, or the printer 100 and one or more of its components can be included in a system 101 configured for three-dimensional fabrication of objects 112 according to the embodiments described herein. For example, in an aspect, the printer 100 and controller 110 may be separate components within the system 101. Separate components in the system 101 may communicate with one another through one or more network interfaces 136 as described below.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling affect, or any other thermoelectric heating and/or cooling devices. Thus the thermal element 130 may be a heater that provides active heating to the build platform 102, a cooling element that provides active cooling to the build platform 102, or a combination of these. The heater 130 may be coupled in a communicating relationship with the controller 110 in order for the controller 110 to controllably impart heat to or remove heat from the surface 116 of the build platform 102. Thus, the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyer 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (e.g., smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. As another example, the extruder 106 may be stationary while the conveyor 104 is x, y, and z positionable. As another example, the extruder 106 may be x, y, and z positionable while the conveyor 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyor 104, the x-y-z positioning assembly 108, and the other various components of the printer 100. In general, the controller 110 is operable to control the components of the printer 100, such as the build platform 102, the conveyor 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyor 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyor 104. This may include an optical detector arranged in a beam-breaking configuration to sense the presence of the object 112 at a location such as an end of the conveyor 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware, or within a web page provided by a web server hosted by the three-dimensional printer 100. Thus, in one aspect there is a user interface adapted to present a video feed from at least one video camera of a three-dimensional printer to a remote user through a user interface.

The sensor 134 may include may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and the like.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and the like. Other hardware 135 may also or instead include a variety of cable connections and/or hardware adapters for connecting to, e.g., external computers or computing devices, external hardware, external instrumentation or data acquisition systems, and the like.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

The warping of a three-dimensional printed surface is a well-known problem due to the heat differential of the environment surrounding build material as it is being extruded and laid down. For example, when lines of build material, e.g., filament, are extruded directly next to each other during a three-dimensional print, one side of the deposited filament faces heated build material that was extruded immediately prior and the other side typically faces cooler air. This can lead to warping as the extruded filament cools at different rates throughout its length and width. In general, build patterns are described herein that can reduce the heat differential around filament that is being extruded.

These build patterns can be applied, for example, to the fabrication of solid surfaces that form the planar, horizontal (x-y plane aligned), exposed surfaces of a printed object (e.g., the exposed bottoms and tops of a printed object). Often, solid surfaces are specified after a three-dimensional model has been sliced into two-dimensional contours and regions of the contours have been identified as solid (as opposed to sparse or support), and the build patterns discussed herein can then be applied to these solid surfaces. Alternatively, the build patterns can be applied to other areas of a three-dimensionally fabricated object, e.g., sparse fill and the like.

Devices, systems, and methods utilizing different build patterns will now be described. In general, the techniques described herein may be applied to reduce warping by avoiding direct contact between adjacent segments (e.g., adjacent linear segments or adjacent segments having similar patterns) of build material that have different temperatures and/or are cooling at different rates, except under certain conditions. In particular, when two non-adjacent lengths have substantially cooled, another length may be deposited between these two non-adjacent lengths, where the two non-adjacent lengths effectively form symmetric (thermal and physical) rails for the new length of build material and can prevent any cooling-induced curvature toward either of the first two non-adjacent lengths. Or, alternatively stated, by depositing offset, consecutive lengths of build material and then filling gaps created therein after the deposited material is allowed to cool, more uniform, symmetric thermal patterns (and associated shrinkage patterns) can be created. Or stated more generally, beginning with non-adjacent segments/lengths of deposited build material can effectively diffuse or disperse heat and accommodate cooling-induced shrinkage in a more uniform manner than when depositing consecutive segments/lengths of build material directly next to each other. The techniques and build patterns described herein may be made possible because heat travels symmetrically away from deposited lengths of build material in a direction perpendicular to the length of build material.

Figure 2:
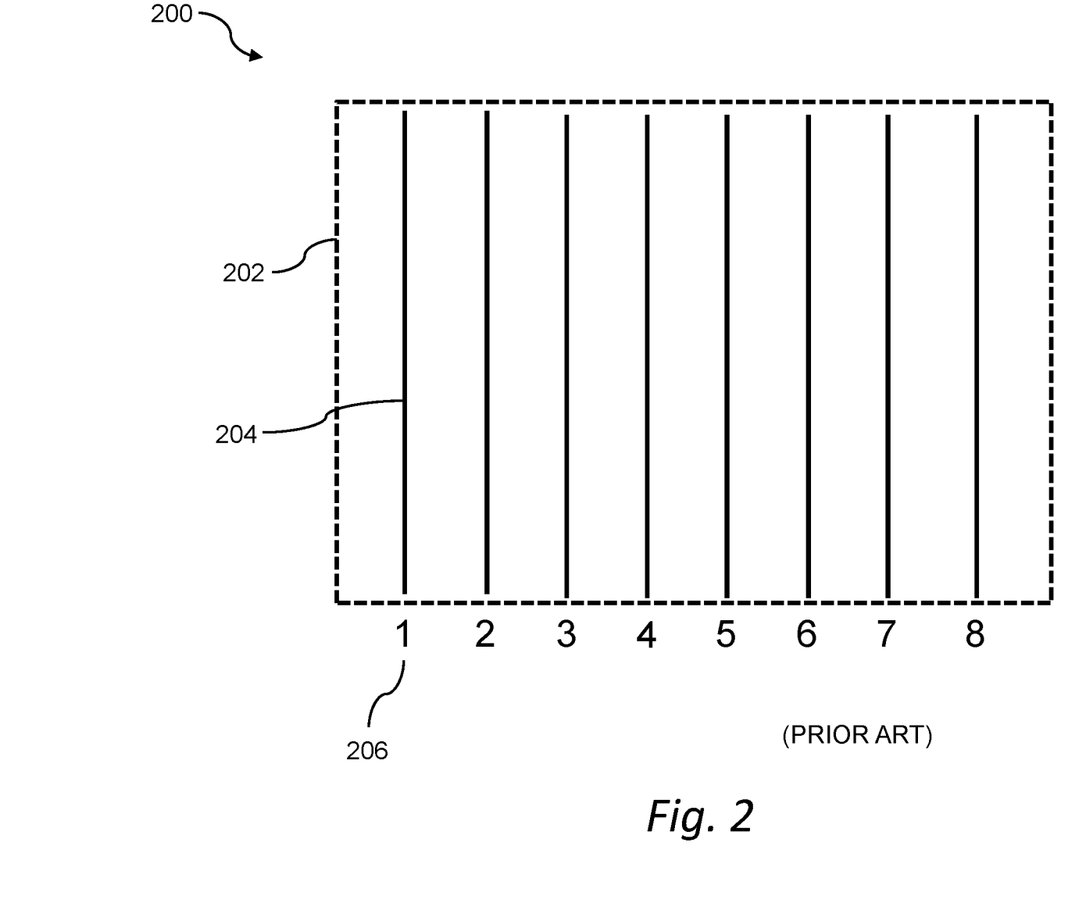
FIG. 2 shows a build pattern of the prior art.

FIG. 2 shows a build pattern of the prior art. Specifically, the figure shows an example of a standard, solid build pattern 200 that can form an exterior surface of a three-dimensionally printed object deposited on a build platform or the like. The solid build pattern 200—that is, a continuous surface without openings, or a 'watertight' surface—is depicted as a rectangle, which may be printed as a shell 202 about the perimeter of a surface, and then spanned by lengths 204 of build material. The lengths 204 represent a solid fill, where the lines shown in the figure represent the centerline of each length 204 of build material deposited in a three-dimensional fabrication process. Thus, the resulting printed surface may be solid with no gaps. For each length 204 representing the solid fill, the number 206 included below the length 204 indicates the order in which the length 204 was extruded. Thus, as shown in the figure, the lengths 204 are each extruded consecutively, such that each length 204 is deposited directly adjacent to a length 204 that is deposited immediately prior. By printing in this manner, one side of the deposited length 204 of build material will face a heated length 204 that was deposited immediately prior and the other side will face cooler air, which as discussed above can lead to warping.

It will be understood that, while a rectangle is shown in the figures, the exterior surface may be of any shape according to the three-dimensional object that is being fabricated.

Figure 3:
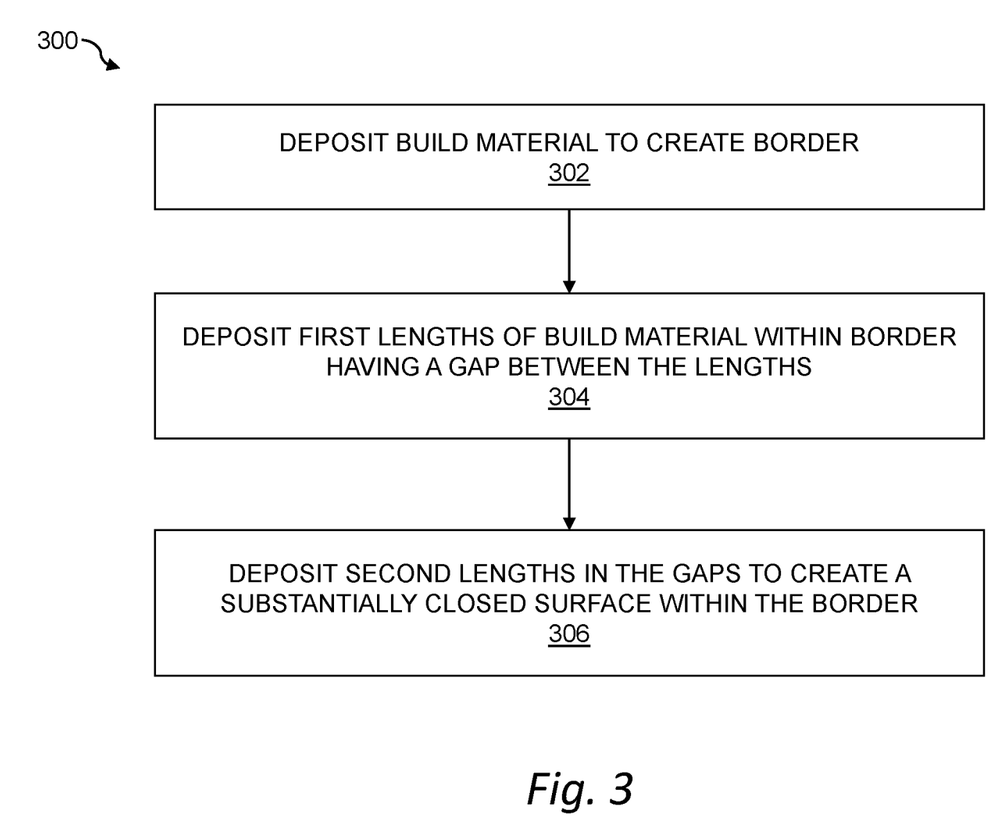
FIG. 3 is a flow chart illustrating a method for forming a surface of an object.

FIG. 3 is a flow chart illustrating a method for forming a surface of an object. In general, the method 300 may be implemented on any of the three-dimensional printers described above or otherwise known in the art. It will be appreciated that the actual fabrication steps may be controlled dynamically by a printer during fabrication, or may be encoded into machine-ready code that can be executed by the three-dimensional printer, e.g., by a slicing engine or other software component or module that converts a three-dimensional model into a series of instructions executable by the printer to fabricate a corresponding object. While the method 300 may be used in a variety of circumstances, one particularly advantageous use contemplated herein is for the fabrication of an initial, exterior surface of an object where there are no other stabilizing structures around the deposited material to prevent cooling-induced deformation.

In general, the techniques contemplated herein may employ multi-pass patterns where individual lengths of material are spaced apart to permit cooling of individual straight lengths before they are coupled together into the watertight exterior surface. While some specific patterns are contemplated in the examples provided herein, it will be appreciated that more generally any of a variety of interleaving or spacing patterns may be employed, provided they permit each segment of deposited build material to either (a) cool independently of other segments of deposited build material, or (b) cool in-between two other previously cooled segments of deposited build material in order to mitigate non-axial thermally-induced strains.

As shown in step 302, the method 300 may include depositing build material to create a border. More specifically, this step may include depositing build material around a two-dimensional cross-section of the object (or of a support structure for the object) at a first z-axis height thereby forming a border of the object that establishes an outline of the shape in that z-axis plane. The two-dimensional cross-section of the object may include without limitation an exposed surface of the object, a surface layer of a raft (a supporting substructure) fabricated for the object, a first layer of the object, a first layer of a bridge (a supporting superstructure) fabricated for the object, a top layer of a base of the object, and so forth.

As shown in step 304, the method 300 may include depositing a first plurality of lengths of build material within the border. The first plurality of lengths may be spaced apart by a predetermined distance such that there is a gap disposed between each length included in the first plurality of lengths. It will be appreciated that this first plurality of lengths may include lengths of material spanning the entire surface of the planar shape, or some sub-portion thereof. In other words, a small number of segments with gaps may be disposed in the plane, and then filled in subsequent passes, or a large number of segments with gaps may be disposed spanning the entire area enclosed by the border, and then these gaps may be filled one at a time. It will further be appreciated that the gaps may have any of a variety of widths. For example, each gap may accommodate two, three, or more additional lengths of build material, or each gap may be sized for a single length of additional build material. In embodiments, each gap may be slightly smaller than the anticipated thickness of the length of build material so that the material diffuses into and fills the gap to bond the non-adjacent lengths of material on each side. That is, each gap disposed between the lengths included in the first plurality of lengths may separate the lengths by a predetermined distance that is less than a known width of a solidified length of build material. In this manner, when a length of build material is deposited in the gap, it may substantially fill the gap when the deposited build material solidifies.

As shown in step 306, the method 300 may include depositing a second plurality of lengths of build material including individual lengths deposited in the gaps disposed between each length in the first plurality of lengths. Depositing the second plurality of lengths of build material may create a substantially closed surface within the border, e.g., a water-tight surface. This may be accomplished by the second plurality of lengths substantially filling each gap disposed between each length included in the first plurality of lengths. To this end, as stated above, the gaps between each length included in the first plurality of lengths may separate the lengths by a predetermined distance that is less than a known width of a solidified length of build material.

The second plurality of lengths may be consecutively deposited after the first plurality of lengths. Thus, in an implementation, the first plurality of lengths are consecutively deposited leaving gaps in-between each length in the first plurality of lengths, and then the second plurality of lengths are consecutively deposited thereby filling those gaps. In this manner, the first plurality of lengths may be allowed to cool to a predetermined temperature, or for a predetermined time period, before a length of build material is deposited directly adjacent to a deposited length in the first plurality of lengths.

The lengths of build material described above (e.g., the first plurality of lengths and the second plurality of lengths) may include substantially linear segments. When including linear segments, the first plurality of lengths and the second plurality of lengths may be substantially parallel to one another. For example, in an aspect, each one of the first plurality of lengths of build material is substantially parallel to each other one of the first plurality of lengths. Further, each one of the second plurality of lengths of build material may be substantially parallel to each other one of the second plurality of lengths (and/or parallel to the first plurality of lengths). In another aspect, the lengths of build material (e.g., the first plurality of lengths and the second plurality of lengths) may include non-linear segments such as segments forming a pattern, e.g., a zig-zag pattern or the like. When including a pattern, lengths in the first plurality of lengths and the second plurality of lengths may include the same or similar pattern offset from one another, or may be otherwise configured to cooperate or fit together with one another to enable the creation of a substantially closed surface within the border.

In general, the first plurality of lengths and the second plurality of lengths may be deposited such that no consecutively deposited lengths of build material are located directly adjacent to one another, thus allowing each deposited length of non-adjacent build material to cool before a length of build material is deposited directly adjacent to it. Similarly, when the gap-filling lengths are deposited, they may be deposited between two equally cooled and dimensionally stable lengths of build material, thus avoiding non-axial deformation of the new length of build material.

Figure 4:
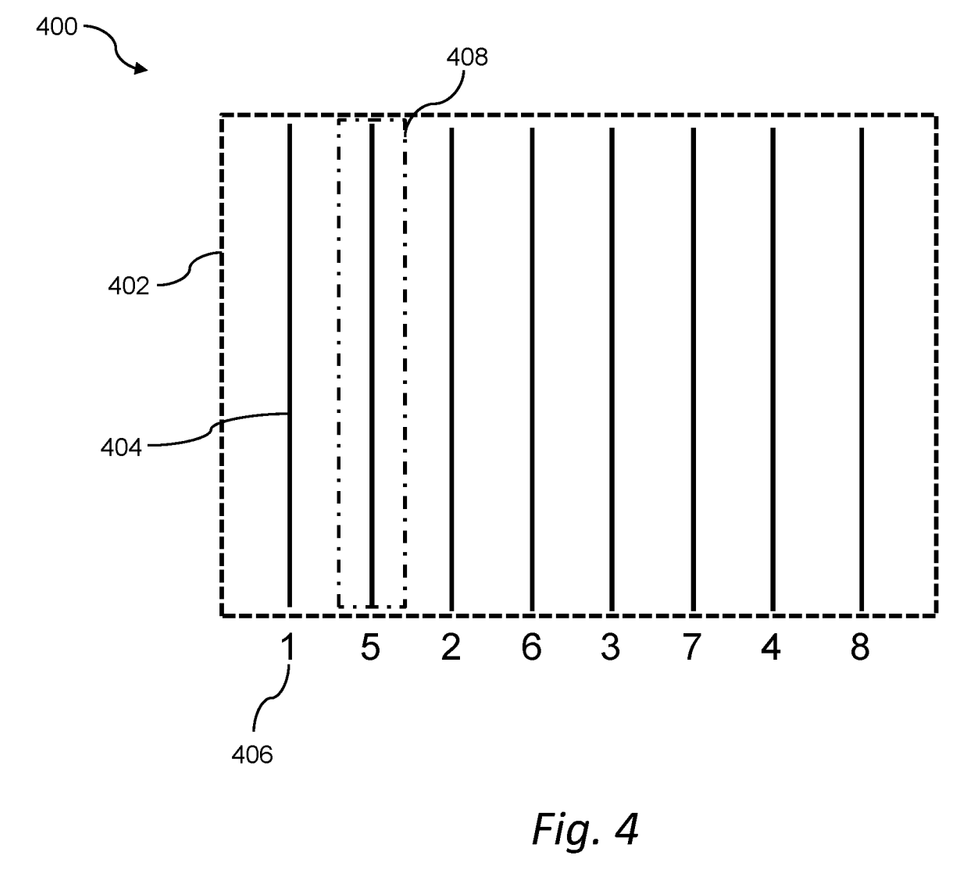
FIG. 4 shows a build pattern using staggered lengths of build material.

FIG. 4 shows a build pattern using staggered lengths of build material. This represents an implementation of the multi-pass patterns described above, and more specifically a multi-pass pattern in which an entire area is filled with spaced-apart, non-adjacent lengths of material, and then all of the resulting gaps are filled with additional lengths of build material. In general, a border 402 is deposited first, and then lengths 404 of build material are deposited (e.g., linearly) in a pattern spanning the border 402. In the figure, a number 406 is provided under each length 404 indicating the order in which it was deposited in a three-dimensional printing process.

The border 402 may represent the exterior or shell of a two-dimensional cross-section of an object being fabricated in a three-dimensional printing process. Although a substantially rectangular region is shown, one skilled in the art will recognize that an effectively infinite number of shapes and sizes of the border 402 are possible.

The lengths 404 of build material may represent filament that is extruded from an extruder of a three-dimensional printer such as any of the printers described above in a build process to form at least a portion of a three-dimensional object. In one aspect, the portion of the three-dimensional object is an exterior surface of the object abutting a build platform or the like. The lengths 404 may completely fill in the border 402 to provide a solid, planar version of the cross-section of the object. The lengths 404 are depicted in the figure as lines, which may represent the centerline of each length 404 of build material deposited in a three-dimensional fabrication process. Although the lengths 404 are depicted in the figure as lines, other patterns or paths are also or instead possible.

As shown by the numbers 406 included below the lengths 404, in an aspect, every other line is skipped before returning to fill in the gaps formed in-between the lengths 404. For instance, the figure shows a first line printed (line #1 in the figure), then a section skipped (i.e., the gap 408 in which the fifth line will fill), then the second line is printed (line #2 in the figure), then a section is skipped, then the third line is printed (line #3 in the figure), and so on and so forth. In this manner, the first plurality of lengths would include the first through fourth lines printed. Once the fourth line is printed (line #4 in the figure), the build pattern 400 may then include the depositing of the second plurality of lengths as described herein, i.e., to fill the gaps formed between the first plurality of lengths. For example, as shown in the figure, the gap 408 between the first line and the second line is filled (or substantially filled) by the fifth line (line #5 in the figure). Then, the build pattern 400 may continue to fill in the gaps formed between the first plurality of lengths, i.e., by printing the sixth line (line #6 in the figure) between the second and third line, the seventh line (line #7 in the figure) between the third and fourth line, and the eighth line (line #8 in the figure) between the fourth line and the border 402. It will be appreciated that the gaps may be filled in any other suitable order, provided that the non-adjacent lengths of material surrounding each gap have had time to cool to a sufficiently stable, uniform temperature to avoid thermally-induced deformation when the gap is filled. It will also be appreciated that the gaps may be filled such that there is an overlap between lengths of build material, or conversely, such that there is no overlap between lengths of filament. For example, in an aspect, a gap is filled with a predetermined amount of build material such that no gap remains (i.e., the gap is substantially filled and adheres to adjacent lengths of build material) but without overlapping with adjacent lengths of build material such that a z-axis height is not unintentionally increased for a printed layer.

In one aspect, the build pattern 400 shown in the figure may thus include a pattern in which no consecutively deposited lengths of build material are located directly adjacent to one another. It will be understood that such a pattern of non-adjacent consecutive lengths of material may be used for a portion of the surface being fabricated, or for all of the surface being fabricated, or some combination of these where multiple, independent surfaces are being fabricated at one time. The build pattern 400 shown in the figure represents a pattern where all gaps are filled on the second pass of the extruder across the pattern. To this end, the gaps may be filled in the order they were created, i.e., the gap 408 between the first and second line is filled, and then the gap between the second and the third line is filled, and so on, or in any other suitable order.

A person of ordinary skill will recognize that the number and shape of the lengths shown in this figure, and the other figures described herein, are provided by way of example only, and that any number or shape of lengths may be utilized for these build patterns and are intended to be included in this disclosure. Additionally, although every other consecutively deposited length of build material is skipped in the figure above, additional interleaving patterns can be generated automatically through recursion, e.g., by specifying the number of desired passes, gaps, and so forth. Implementations may also or instead include skipping more lengths (i.e., including larger gaps in-between lengths).

Figure 5:
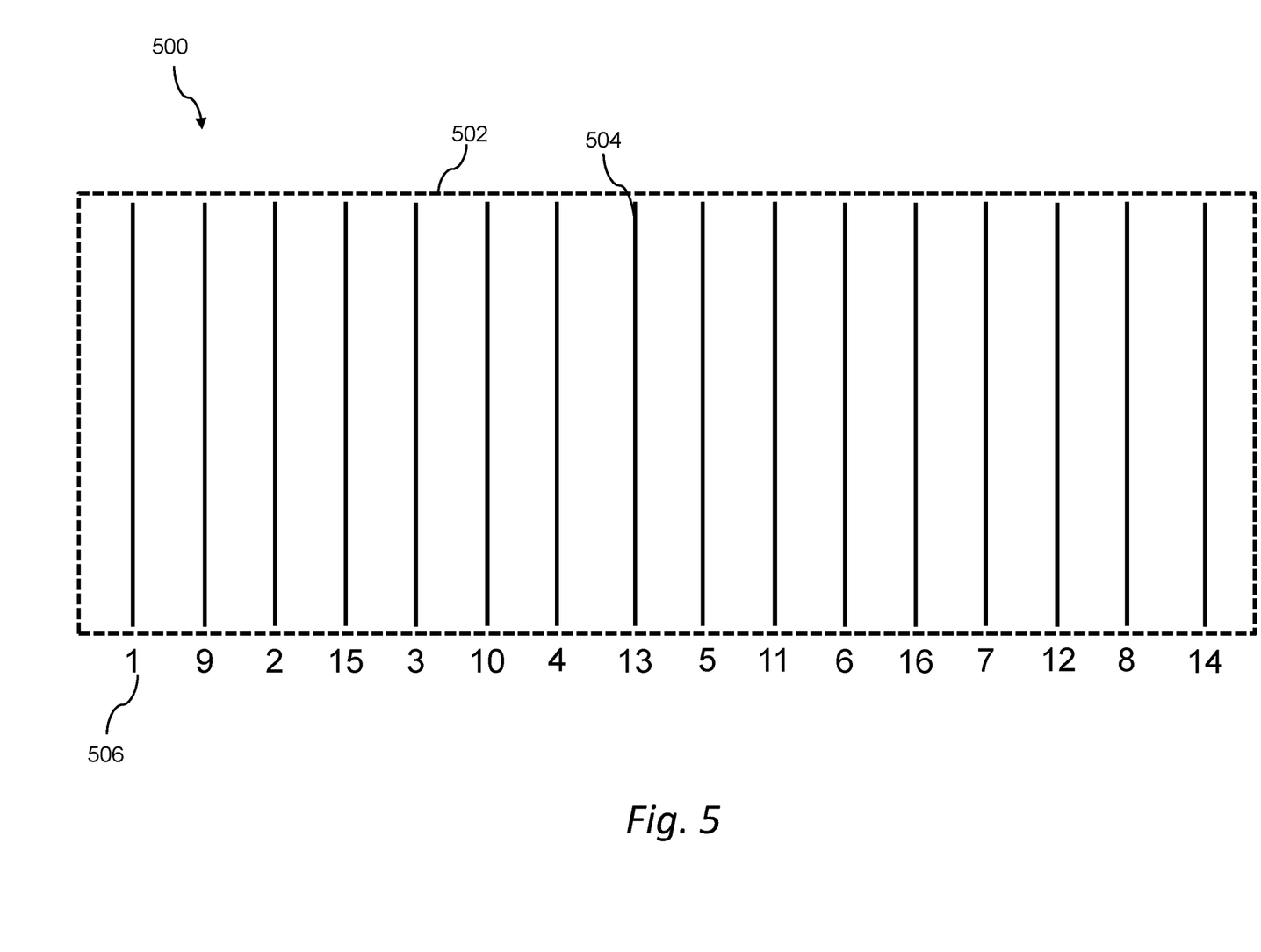
FIG. 5 shows a build pattern using staggered lengths of build material.

FIG. 5 shows a build pattern using staggered lengths of build material. In the build pattern 500 of FIG. 5, a more complex staggered or multi-pass pattern is employed.

In contrast to the figure shown above, the gaps in the build pattern 500 shown in this figure are not filled in the order in which they were created. For example, after spanning the border 502 with the set of first lengths (i.e., the lines identified by numbers 506 one through eight), the build pattern 500 may then fill the gap between the first line and the second line, then fill the gap between the third line and the fourth line, then fill the gap between the fifth line and the sixth line, and so on, before circling back to fill the remaining gaps. In this manner, the gaps between the second and third line, the fourth and fifth line, and the sixth and seventh line are not filled in on the first pass, but rather a subsequent pass by the extruder. As stated above, additional interleaving patterns are also or instead possible using the principles of the disclosure set forth herein.

Figure 6:
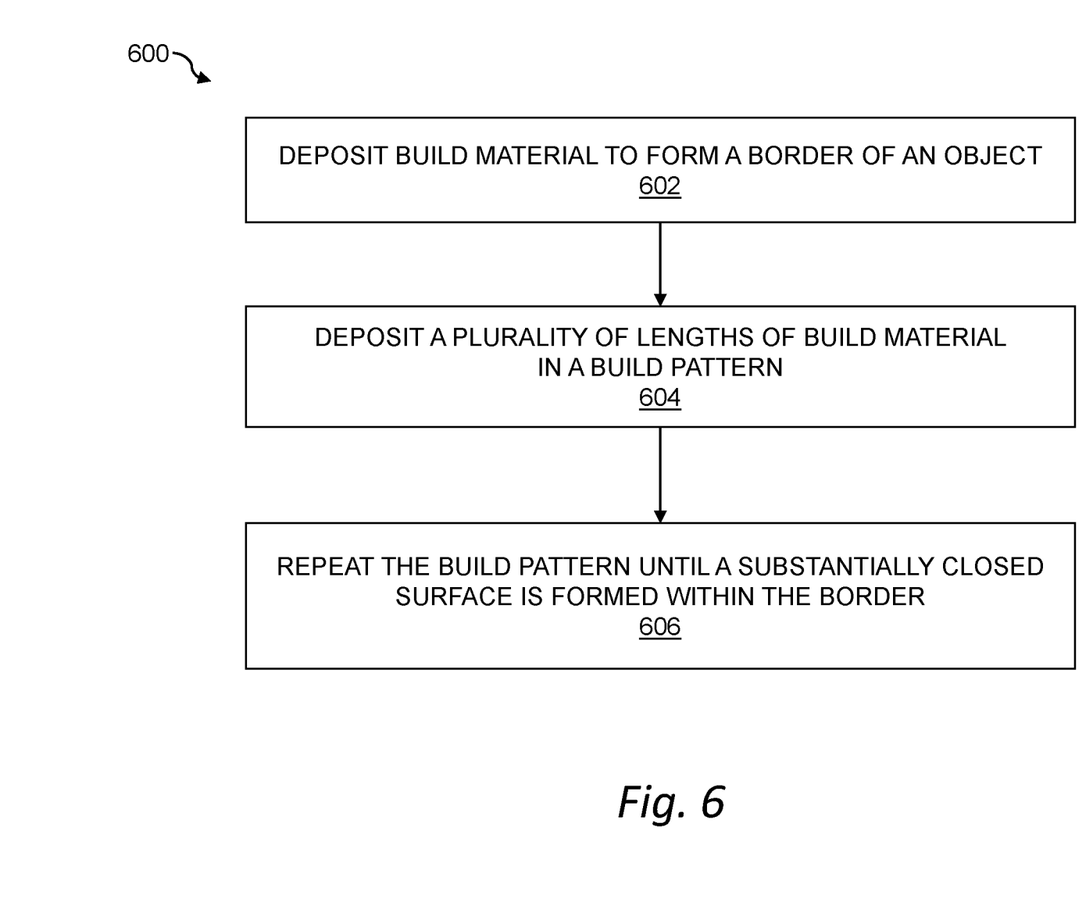
FIG. 6 is a flow chart illustrating a method for forming a surface of an object.

FIG. 6 is a flow chart illustrating a method for forming a surface of an object. In general, the method 600 may be implemented on any of the three-dimensional printers described above. It will be appreciated that the actual fabrication steps may be controlled dynamically by a printer during fabrication, or may be encoded into machine-ready code that can be executed by the three-dimensional printer, e.g., by a slicing engine or other software component or module that converts a three-dimensional model into a series of instructions executable by the printer to fabricate a corresponding object. As discussed above, the method 600 may be performed by extruding filament from an extruder of a three-dimensional printer.

In this method 600, a skip is introduced between gap-creating deposits. Thus, while the method 600 still contemplates a general pattern of creating and filling gaps, each gap is filled immediately after it is created, resulting in a more general pattern of alternately printing non-adjacent and adjacent lengths of material. This general pattern can alleviate ridging issues—where gap-filling lengths cannot reach all the way to an underlying surface—that might otherwise amplify the ridging of a typical fused deposition modeling process, and potentially compromise the structural integrity of the printed surface.

As shown in step 602, the method 600 may include depositing build material to create a border. More specifically, this step may include depositing build material around a two-dimensional cross-section of the object at a first z-axis height thereby forming a border of the object as generally described above. The two-dimensional cross-section of the object may span any size or shape suitable for forming a surface of a three-dimensional object based on, e.g., a three-dimensional model of the object.

As shown in step 604, the method 600 may include depositing a plurality of lengths of build material within the border, where the plurality of lengths are deposited in an alternating pattern of non-adjacent and adjacent linear lengths. Thus, in one aspect, the build pattern may include at least two consecutive lengths of build material deposited directly adjacent to one another and at least two consecutive lengths of build material deposited non-adjacent to one another. In one aspect, a first length is deposited such that there is a gap between the first length and the border, i.e., so that cooler air (i.e., relative to the deposited length) surrounds the first length. The second length may then be deposited between the border and the first length, i.e., such that the recently deposited border is on one side of the second length and the recently deposited first length is on the other side of the second length. In this manner, the second length may fill the gap between the border and the first length after the border and the first length have had an opportunity to cool to a similar temperature (e.g., in an embodiment where they were both recently deposited).

The first length may be deposited in a predetermined manner relative to the border, e.g., where the first length is deposited close to a more recently or most recently deposited portion of the border. The first length may also be disposed at a predetermined distance away from the border, specifically at a distance that is less than a known width of a solidified length of build material, e.g., at the present deposition rate.

The build pattern may further include a third length of build material deposited directly after the two consecutive lengths. The third length may be located offset from the two consecutive lengths by a predetermined distance such that there is a gap between the two consecutive lengths and the third length. For example, the third length may be located a predetermined distance away from the first length such that there is a gap between the first length and the third length—i.e., the first length includes the second length on one side, and a gap on its other side with the third length disposed adjacent to the gap. The predetermined distance may be less than a known width of a solidified length of build material in order to permit a subsequent length of material to deform and bond to each of the surrounding lengths of cooled material.

The build pattern may further include a fourth length of build material deposited in the gap between the two consecutive lengths and the third length. The fourth length of build material may substantially fill the gap between the two consecutive lengths and the third length.

In this manner, in an aspect, observing the build pattern along an axis disposed across the lengths (e.g., viewing the build pattern from left to right), the build pattern may include the second length, the first length, the fourth length, and then the third length. Depositing lengths of build material in this build pattern may assure that lengths are either deposited separated from one another thereby forming gaps in-between, or are deposited such that they fill these gaps. In this build pattern example, the first length and the border form a gap, and the second length fills the gap; then, the third length is deposited away from the first length to form a gap, and the fourth length fills the gap.

As shown in step 606, the method 600 may include repeating the build pattern until a substantially closed surface is formed within the border. The substantially closed surface may be a water-tight surface. Each of the plurality of lengths of build material may be substantially linear and substantially parallel to one another. In another aspect, each length may have a non-linear, e.g., curving, arced, or angled path, with other adjacent and non-adjacent lengths of material using the same general path to form parallel, non-linear segments.

Figure 7:
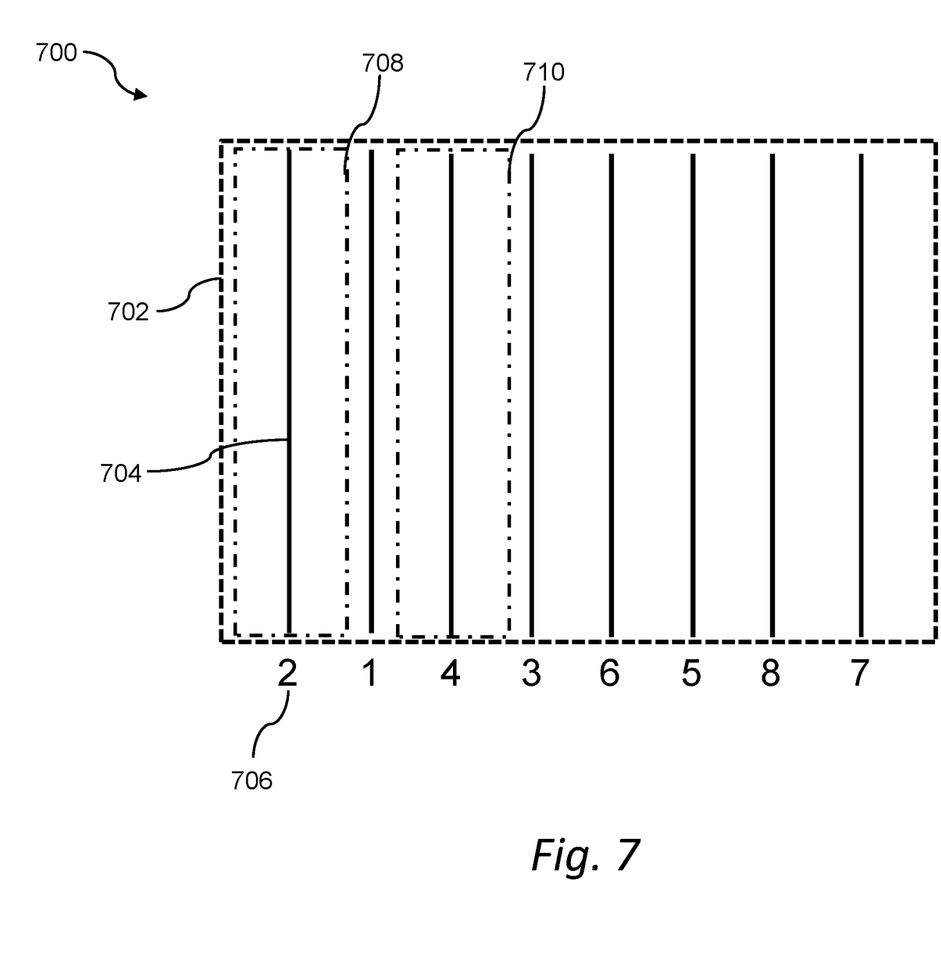
FIG. 7 shows a build pattern using staggered lengths of build material.

FIG. 7 shows a build pattern using staggered lengths of build material. In general, the build pattern 700 may be a pattern realized using the method 600 described above, where an alternating sequence of non-adjacent and adjacent lengths of build material are deposited. Specifically, the figure shows a border 702 with lengths 704 of build material spanning the border 702, where a number 706 included below each length 704 indicates an order in which the length 704 was deposited. As discussed herein, although the border 702 is shown as a rectangle and the lengths 704 are shown as lines, many shapes are possible, and thus the regular geometry displayed in FIG. 7 is provided only for convenience.

As shown by the numbers 706 included below the lengths 704, the lengths 704 are deposited such that they form gaps in-between lengths 704, and then these gaps are subsequently filled with build material in a next deposited linear length after the gap is created. For instance, the figure shows a first line (line #1 in the figure) printed such that it leaves a first gap 708 between the border 702 and the first line. Then, a second line (line #2 in the figure) may be printed to fill the first gap 708. The build pattern 700 may then include printing a third line (line #3 in the figure) adjacent to the first line, but forming a second gap 710 between the first line and the third line. A fourth line (line #4 in the figure) may then be printed to fill the second gap 710. The build pattern 700 may then be repeated to span the border 702, e.g., filling or substantially filling the border 702. The build pattern 700 shown in the figure may thus include a pattern in which build material is either deposited non-adjacent to other lengths of build material, or between lengths of non-adjacent material before they are fully cooled, thus affording improved pliability of and adhesion to surrounding lengths of material.

In another aspect, a build pattern may include any suitable combination of alternating and spaced apart patterns, e.g., by incorporating sequences from both the method 600 of FIG. 6 and the method 300 of FIG. 3 in a single process for depositing a complete, exterior surface of an object. All such variations are intended to fall within the scope of this disclosure.

Figure 8:
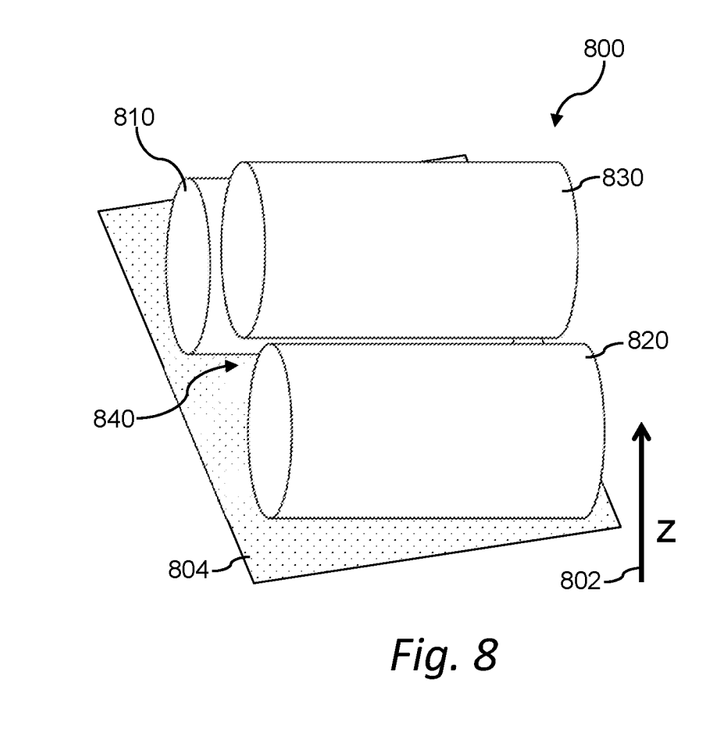
FIG. 8 illustrates ridging of adjacent lengths of build material.

FIG. 8 illustrates ridging of non-consecutively printed lengths of build material, more specifically following a long delay between non-adjacent lengths and subsequent gap-filling lengths. Specifically, FIG. 8 shows a ridged surface 800 relative to a z-axis 802 and a base 804 on which the ridged surface 800 is printed. The base 804 may include a build plate, a build platform, a surface of previously printed build material, and the like.

The ridged surface 800 may include a first length 810 of build material, and a second length 820 of build material printed spaced apart from one another by a predetermined distance before filling the resulting gap 840 with a third length 830 of material. As shown in the figure, the ridged surface 800 may be formed by the third length 830 settling above the z-axis height of the first length 810 and the second length 820 and failing to fully deform and fill the gap 840. This may be a side effect of depositing heated material adjacent to cooled material that resists deformation. As a result of the rigidity of the first length 810 and the second length 820, the third length 830 cannot settle to the height of the base 804 to form a smooth, uniform exterior surface. Instead, the bulk of the material of the third length 830 remains at an elevated z-axis height relative to the previously printed build material.

Figure 9:
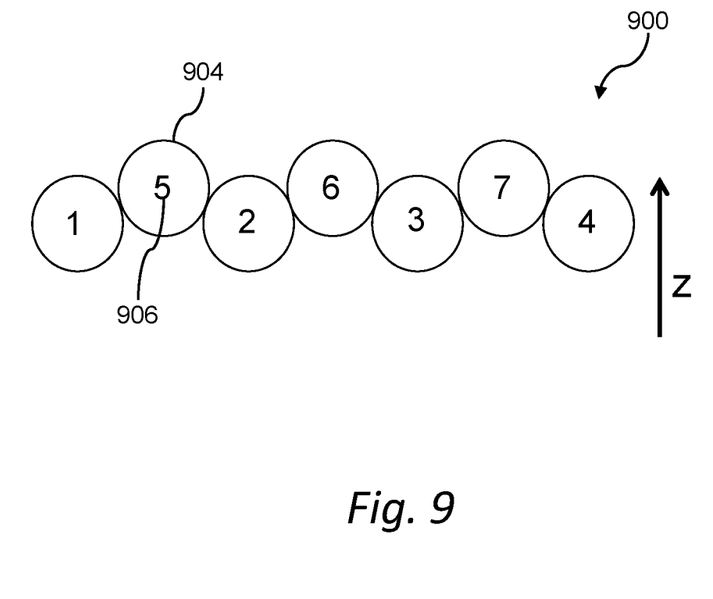
FIG. 9 illustrates ridging of adjacent lengths of build material.

FIG. 9 illustrates ridging of non-consecutively printed lengths of build material. The build pattern 900 shown in the figure includes lengths 904 of deposited filament, where the number 906 included within the cross-section of the length 904 indicates the order in which the length 904 was deposited.

As shown by the figures above, ridging can result in undesirable gaps, e.g., in a solid fill. This may occur because lengths extruded later (forming the upper extrusions shown in the figures) may adhere to one neighbor more than another, and/or because the fully cooled lengths become too rigid to yield and accommodate gap-filling material. In one aspect, these ridging effects may be mitigated by alternating between non-adjacent and adjacent lengths of material as described above, which helps to apply gap-filling material before the bordering lengths of material have fully cooled. An aspect may also or instead include over-extruding—e.g., increasing the volume deposition rate—to more completely fill all gaps and/or provide excess build material in the lengths of the build pattern to fill the gaps formed between previously extruded lengths. An aspect may also or instead include under-extruding the non-adjacent lengths of build material, e.g., decreasing the volume deposition rate for lengths that are spaced apart to allow for additional space in the gap to accommodate subsequent, gap-filling extrusions. An aspect may also or instead include one or more of reducing the speed of a print head during gap-filling extrusions, increasing the temperature during gap-filling extrusions, or otherwise facilitating the axial deformation of the gap-filling lengths of material into the full volume of the gaps being filled. Aspects may also or instead include having the extruder move a fraction of a z-axis step closer to the build platform, or using other measures to force a length of material into each gap.

The build patterns shown and described above may have many applications in three-dimensional printing. For example, these build patterns may be used for raft surface layers where warping can adversely affect the adhesion of a printed object to the raft, which can cause defects in the printed object. The build patterns may also or instead be used for the first layer of a printed object (e.g., a floor, a roof, or an otherwise exposed layer), for instance on top of supports and rafts where warping can occur. The build patterns may also or instead be used for the first bridge layer (i.e., the exposed layer) where warping can occur. The build patterns may also or instead be used for a base roof layer (i.e., the unexposed, interior layer), e.g., disposed on top of sparse fill where warping can occur. Using these build patterns for a base roof layer or the like may enable the printing of fewer roof layers than are typically required to conceal defects caused by warping. In general, the build patterns may be utilized for any layers of a printed object, such as those that have sparse fill below and those where adhesion is limited.

The build patterns may also or instead be used for three-dimensional printing at a height that is greater than a typical printing height. For example, three-dimensional printing at a height greater than about 0.3 mm above a build surface may be particularly prone to warping. This is because, in general, there may be a relationship between layer height, the horizontal warping force, and the diameter of the nozzle of an extruder. More specifically, the horizontal warping force generally increases with layer height. Thus, the build patterns may be used for three-dimensional printing above a typical build height. In an aspect, the build patterns are used for three-dimensional printing above about 0.3 mm, e.g., about 0.4 mm layer height printing, which can reduce print times. This can be done for the printing of, e.g., the first layer of an object, the base roof layer, the exposed surfaces of a printed object, and the like.

The build patterns may also or instead be used for three-dimensional printing using a nozzle of an extruder having a larger diameter than a typical nozzle. For example, in an aspect, the build patterns are used for a 0.8 mm diameter draft nozzle, regardless of the layer height of the print. However, with smaller nozzles (e.g., 0.4 mm diameter nozzles), the build patterns may only be used when printing above a typical build height as described above.

A system including any three-dimensional printing hardware described herein or otherwise known in the art may implement any of the aforementioned build pattern techniques. The system may also or instead include control circuitry configured to operate three-dimensional printing hardware to fabricate a three-dimensional object from a three-dimensional model that describes, at least in part, a desired structure, where the control circuitry is configured to process at least a portion of the three-dimensional object according to any of the contemplated build pattern techniques described herein.

The above systems, devices, methods, processes, and the like may include tool instructions for implanting the build patterns described herein into three-dimensional builds in three-dimensional fabrication systems. For example, an aspect includes generating tool instructions for building a three-dimensional object with a three-dimensional fabrication process. In an aspect, the tool instructions are generated by a controller (e.g., a controller on the three-dimensional printer itself). In another aspect, the tool instructions are generated by a computing device in communication with the printer, e.g., connected via a network interface and sent to the printer, or through a web server or the like.

The tool instructions may include instructions for fabricating at least a portion of the object using one or more of the build patterns described herein. Specifically, the tool instructions may include instructions for depositing build material around a two-dimensional cross-section of the object at a first z-axis height thereby forming a border of the object. The tool instructions may also or instead include instructions for depositing a first plurality of lengths of build material within the border, where the first plurality of lengths are spaced apart by a predetermined distance such that there is a gap disposed between each length included in the first plurality of lengths. The tool instructions may also or instead include instructions for depositing a second plurality of lengths of build material including individual lengths deposited in the gaps disposed between each length in the first plurality of lengths to create a substantially closed surface within the border.

Another aspect includes generating tool instructions for building a three-dimensional object having at least a portion of which that is fabricated using a "skip-1" pattern discussed herein.

The tool instructions may be generated by an algorithm that perfects the tool instructions based on the design of the three-dimensional object to be fabricated. The algorithm may select which areas within the object to use the one or more of the build patterns described herein. For example, an implementation of the algorithm uses one or more of the build patterns when the surface area and aspect ratio of the surface of the object to be printed is optimal for a particular build pattern. For example, one or more exposed surfaces of the object may be optimal for one or more of the build patterns described herein, and the algorithm generates tool instructions accordingly. Similarly, the algorithm may omit the use of one or more of the build patterns when parameters are unfavorable for such patterns. For example, for long slivers of printed material within objects, the heat diffusion advantages of the aforementioned build patterns may not be desired—they may be unnecessary because areas of the sliver can cool before an adjacent area is printed, or they may be detrimental. Additionally, the build patterns themselves may be varied or optimized by the algorithm depending on an object's parameters.

The algorithm may analyze a build in terms of heat dispersion from deposited lengths of filament. In other words, because heat travels symmetrically away from deposited lengths of filament in the direction perpendicular to the filament line, the algorithm may calculate where the build patterns can and should be utilized in a three-dimensional build based on patterns of the heat dispersion for the build.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for forming a portion of an object being fabricated in a three-dimensional fabrication process, comprising:
   depositing build material around a two-dimensional cross-section of the object at a first z-axis height thereby forming a border of the object;
   depositing a first plurality of lengths of build material within the border, the first plurality of lengths spaced apart by a predetermined distance such that there is a gap disposed between each length included in the first plurality of lengths, wherein the gap separates the first plurality of lengths by a predetermined distance that is less than a known width of a solidified length of build material; and
   depositing a second plurality of lengths of build material including individual lengths deposited in the gaps disposed between each length in the first plurality of lengths to create a closed surface within the border, the closed surface being planar, wherein each individual length of the second plurality of lengths filling one of the gaps is deposited before adjacent ones of the first plurality of lengths that form the one of the gaps have cooled to a temperature of a surrounding environment.

2. The method of claim 1, wherein the first plurality of lengths are consecutively deposited to span the border, and wherein the second plurality of lengths are consecutively deposited after the first plurality of lengths.

3. The method of claim 1, wherein the first plurality of lengths and the second plurality of lengths are deposited such that no consecutively deposited lengths of build material are located directly adjacent to one another.

4. The method of claim 1, wherein each length in the second plurality of lengths fills each gap disposed between each length included in the first plurality of lengths.

5. The method of claim 1, wherein the two-dimensional cross-section includes an exposed surface of the object.

6. The method of claim 1, wherein the two-dimensional cross-section includes a surface layer of a raft fabricated for the object.

7. The method of claim 1, wherein the two-dimensional cross-section includes a first layer of the object.

8. The method of claim 1, wherein the two-dimensional cross-section includes a first layer of a bridge fabricated for the object.

9. The method of claim 1, wherein the two-dimensional cross-section includes a top layer of a base of the object.

10. The method of claim 1, wherein the closed surface is a water-tight surface.

11. The method of claim 1, wherein each one of the first plurality of lengths of build material is parallel to each other one of the first plurality of lengths.

12. The method of claim 1, wherein the second plurality of lengths are deposited at a greater volume deposition rate than the first plurality of lengths.

13. A method for forming a portion of an object being fabricated in a three-dimensional fabrication process, comprising:
   depositing build material around a two-dimensional cross-section of the object at a first z-axis height thereby forming a border of the object;
   depositing a plurality of lengths of build material within the border, the plurality of lengths deposited in a build pattern comprising:
      at least two consecutive lengths of build material deposited directly adjacent to one another;
      a third length of build material deposited directly after the two consecutive lengths, the third length located offset from the two consecutive lengths by a predetermined distance such that there is a gap between the two consecutive lengths and the third length, wherein the predetermined distance is less than a known width of a solidified length of build material; and
      a fourth length of build material deposited in the gap between the two consecutive lengths and the third length, wherein the fourth length is deposited before at least one of the two consecutive lengths and the third length have cooled to a temperature of a surrounding environment; and
   repeating the build pattern until a closed surface is formed within the border, wherein the closed surface is planar.

14. The method of claim 13, wherein the fourth length of build material fills the gap between the two consecutive lengths and the third length.

15. The method of claim 13, wherein the closed surface is a water-tight surface.

16. The method of claim 13, wherein the two-dimensional cross-section includes an exposed surface of the object.

17. The method of claim 13, wherein the two-dimensional cross-section includes at least one of a surface layer of a raft fabricated for the object, a first layer of the object, a first layer of a bridge fabricated for the object, and a top layer of a base of the object.

18. The method of claim 13, wherein each of the plurality of lengths of build material is parallel to one another.

19. The method of claim 18, wherein each of the plurality of lengths of build material is linear.

20. The method of claim 13, wherein the fourth length is deposited at a greater volume deposition rate than at least one of the two consecutive lengths and the third length.

* * * * *